June 23, 1964  O. F. BLOM  3,138,211
MULTI-PURPOSE GARDEN IMPLEMENT
Filed Jan. 23, 1962  2 Sheets-Sheet 1
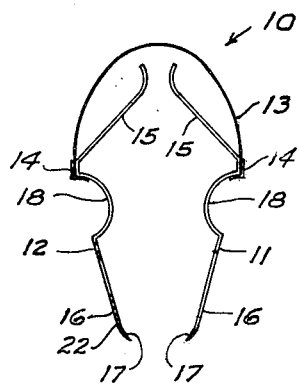
Fig. 1
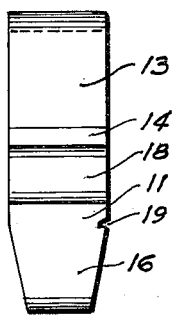
Fig. 2
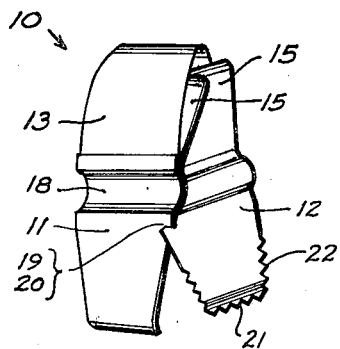
Fig. 3
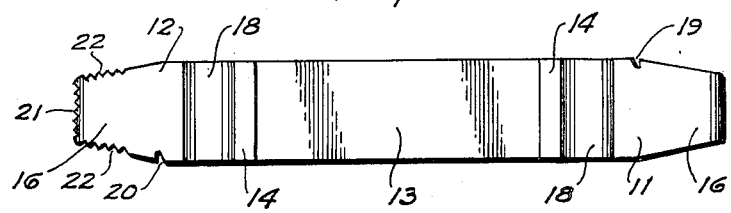
Fig. 4
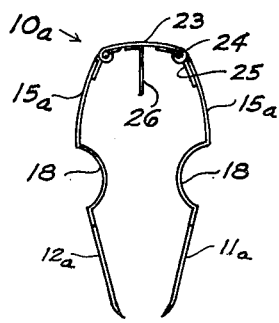
Fig. 5
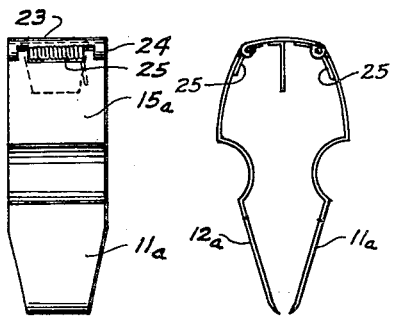
Fig. 6
Fig. 7
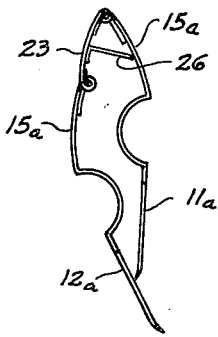
Fig. 8
INVENTOR.
OTTO F. BLOM
BY Row & Row
HIS ATTORNEYS June 23, 1964  O. F. BLOM  3,138,211
MULTI-PURPOSE GARDEN IMPLEMENT
Filed Jan. 23, 1962  2 Sheets-Sheet 2
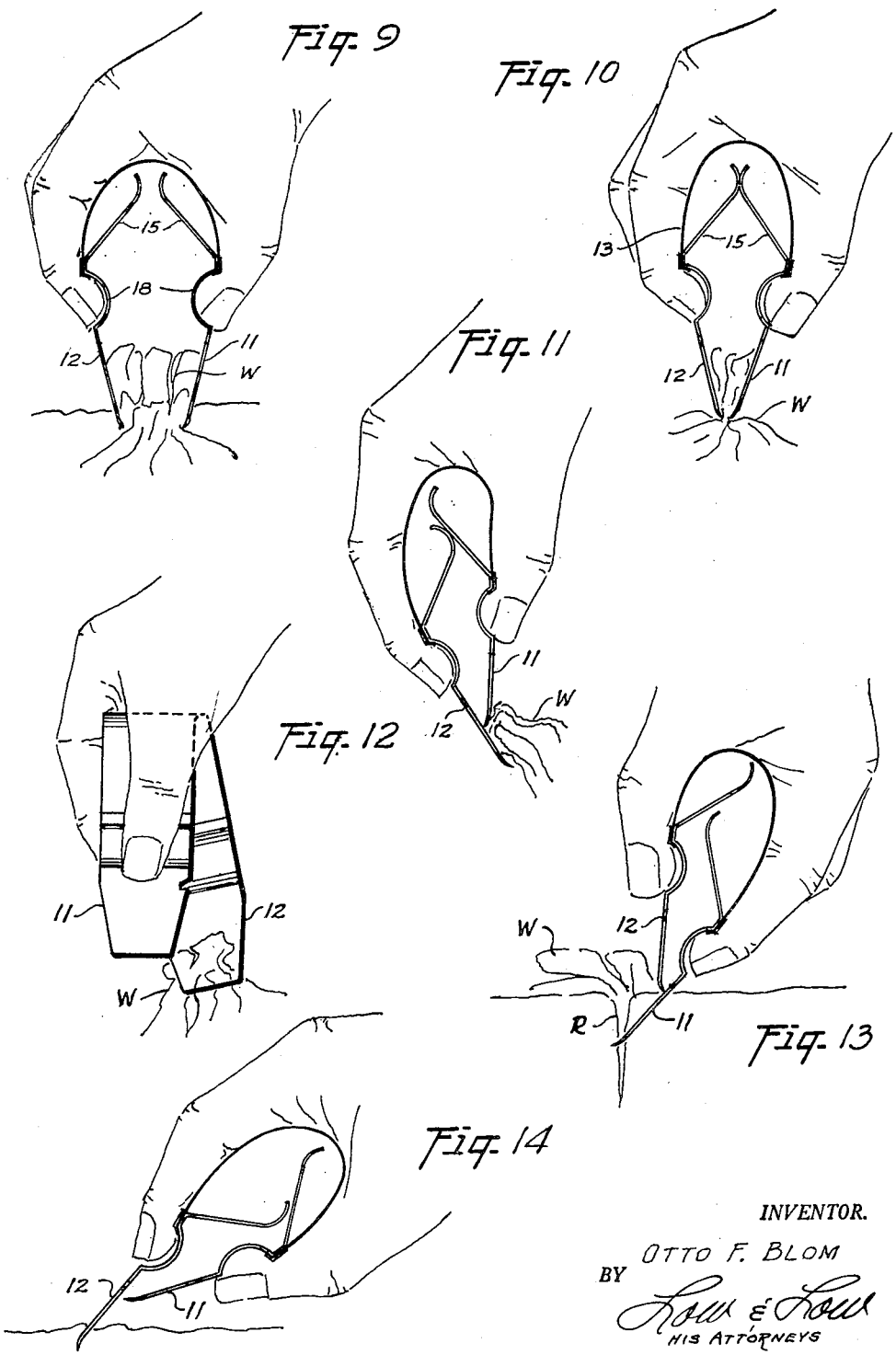
INVENTOR.
OTTO F. BLOM
BY
HIS ATTORNEYS ns # United States Patent Office 3,138,211
Patented June 23, 1964

3,138,211
MULTI-PURPOSE GARDEN IMPLEMENT
Otto F. Blom, 434 Audubon Ave., New York 33, N.Y.
Filed Jan. 23, 1962, Ser. No. 168,128
6 Claims. (Cl. 172—371)

This invention relates to garden implements, and more particularly to a novel and versatile hand-held garden implement which is effective in the performance of a great variety of tasks which are encountered in the care of lawns and small gardens.

An object of my invention is to provide a multi-purpose garden implement which, without modifications or attachments, can be employed to perform the tasks of weed-pulling, tap root severing, raking, light cultivating and the like.

Further, in the performance of the above-noted tasks, assorted debris as leaves, weeds, roots, etc. are picked up by my garden implement. It is therefore an important and novel feature of my invention that my garden implement may be easily actuated to free and discharge the debris by means of relative linear and lateral movement of portions of the implement, the same being accomplished effectively without removing the implement from its normal working position in the hand of the user.

A further object of my invention is to provide a garden implement which is simple in construction and therefore which may be inexpensively fabricated, thus permitting the homeowner to acquire a tool at the lowest possible cost which will capably perform all of the several tasks encountered in gardening.

Another object resides in the provision of a novel cooperation of elements which in addition to permitting low cost manufacture thereof, are also trouble-free and durable, thereby avoiding necessity for replacement or repair of the garden tool.

Other objects and advantages of my novel garden implement will appear from the following detailed description, taken in connection with the accompanying drawings, in which:

FIG. 1 is a side elevation of a preferred form of my garden implement;

FIG. 2 is an end elevation of the implement of FIG. 1;

FIG. 3 is a perspective view of the preferred embodiment, illustrating the manner in which the gripping legs thereof may be interlocked for convenient storage or handling in transport thereof;

FIG. 4 is a top plan view of the compound assembly in flat position from which the implement of FIG. 1 is formed;

FIG. 5 is a side elevation of a modified form of my garden implement;

FIG. 6 is an end elevation of the implement of FIG. 5;

FIG. 7 is a side elevation of the FIG. 5 implement, disclosing the gripping legs in closely adjacent relation.

FIG. 8 is a side elevation of the FIG. 5 implement, illustrating a relative linear shift between the legs;

FIG. 9 illustrates the implement of FIG. 1 in use in extracting a weed or the like from the earth;

FIG. 10 illustrates the gripping action of the implement on the weed to permit the extraction thereof from the earth;

FIG. 11 illustrates the relative linear shift of the gripping legs of the FIG. 1 implement in clearing the implement of the weed;

FIG. 12 illustrates the relative lateral shift of the legs along with the linear shift employed to strip the weed or debris;

FIG. 13 illustrates the implement with its legs linearly shifted to permit the implement to be used to sever weed roots; and, FIG. 14 illustrates the implement in use to gently rake or cultivate a lawn or garden area.

Referring to the drawings, the preferred form of my versatile garden implement is indicated at 10, and comprises a pair of confronting leg members 11, 12, formed from relatively rigid, relatively wide sheet stock. The legs are connected toward their upper ends by an arched spring metal or plastic member 13. The resilient spring member 13 is secured at its opposite ends to each leg as by welding, riveting, or the like, and short pieces 14 are provided to aid in clamping the member 13 to the legs.

The upper portions 15 of each leg 11, 12 converge inwardly as clearly seen in FIG. 1, the terminal upper ends thereof being in closely spaced confronting relation as illustrated when the implement is in its normal position preparatory to use thereof.

The lower portions 16 of legs 11, 12 are inclined inwardly toward one another, and are preferably tapered in width as seen in FIGS. 2 and 4, with each leg lower portion 16 terminating in an inwardly inclined edge 17.

Intermediate the upper spacer portions 15 and the lower blade portions 16 of the gripping legs 11, 12, each leg is inwardly recessed at 18, thereby providing finger grips to facilitate use of the tool, as clearly shown in FIGS. 9–14. The recess 18 preferably extends the full width of each leg, and is of generally semicylindrical curvature, whereby several fingers of the hand may be received within the recesses to thereby permit firm grasping and handling of the implement.

Leg 11 is notched at 19 and leg 12 is notched at 20 on the opposite side of the implement from notch 19, whereby the legs 11, 12 may be laterally shifted and thence compressed toward one another to interengage the notches, as best seen in FIG. 3. With the legs 11, 12 thus locked together, the implement 10 is substantially rigid overall, and may be easily carried or stored. The legs may be unlocked readily by effecting a slight relative lateral shift therebetween, thus separating notches 19, 20 and permitting the tool to spring back to its FIG. 1 position ready for use.

The lower edge 17 of portion 16 of leg 12 is sharpened, and preferably serrated as at 21, FIG. 4, for the purpose of cutting or sawing through a thick or dense weed root, as at R, FIG. 13. Also, one or both lateral tapered edges of said leg portion 16 are also serrated as at 22, FIG. 4, to facilitate the severing of a relatively thick weed root or the like. Of course, the other leg lower portion 16 may also be similarly sharpened if desired.

The above described construction of the preferred embodiment of my garden implement 10 imparts thereto many novel characteristics which render the implement an exceeding versatile instrument in the care and cultivation of lawn and garden, as will be seen from the following discussion of the varied uses to which the tool may be put.

When the implement is grasped and firmly held by means of the thumb and finger recesses 18, the relatively broad, arched resilient spring member 13 is comfortably received within and against the hand between the thumb and forefinger, as seen in FIG. 9, whereby the full strength of the arm and hand may be brought to bear against the tool, if necessary, to easily and readily insert the implement into the ground on either side of a weed W or other objectionable growth. After insertion of the implement about weed W, the thumb and fingers are brought toward one another, whereby the lower leg portions 16 close about the weed, with the sharpened or serrated edges 17 biting into and obtaining a firm grip upon the stem and root structure of the plant, as seen in FIG. 10. Thus the weed may be easily withdrawn from the ground and discarded.

It will be noted from FIG. 10 that the upper portions 15 of the legs 11, 12 are brought into abutting contacting relation as the legs are urged together, which action resists further compression of the U-shaped spring 13, while still permitting inward movement of the blade edges 17. By virtue of this cooperation between the spacer leg portions 15, the arched spring 13 remains relatively distended in conforming relation to the user's hand so as to permit the exertion of a maximum arm and hand strength upon the weed engaging legs. Further, the curved contacting surfaces of the spacer legs 15 serve as an upper fulcrum point, enhancing the capability of the lower leg portions 16 to close about the weed beneath the surface foliage thereof as finger and thumb pressure are applied.

After the weed is withdrawn from the ground by an upwardly directed pulling motion or force, the weed may be easily and readily removed from the tool without removing the hand therefrom, as clearly seen in FIGS. 11 and 12. By virtue of the resilient spring characteristic of the member 13, the leg 11 may be shifted linearly relative to the leg 12 as the spring 13 is effectively rolled along the thumb finger arch of the hand, FIG. 11. This action serves to cleanly wipe the weed from the tool legs, and the weed is thus free to drop in an appropriate receptacle.

The provision of the flat spring member 13 between the legs 11, 12 further permits lateral shifting of one leg 11 relative to the other leg 12, as seen in FIG. 12, whereby the two leg members may be wiped laterally back and forth across one another and also shifted or wiped linearly with respect to one another as seen in FIG. 11. In this fashion the weed or other trash removed from the ground may be speedily and effectively cleared from the tool, and any remaining earth or foliage may likewise be removed by either the linear or lateral shifting movement between the blade legs as aforesaid. Thus it is not necessary to release the implement to clear the weed therefrom, nor is it necessary to use the other hand therefor, the entire operation being carried out simply and cleanly with my novel garden implement by single hand actuation thereof.

The firm grip afforded by my construction, and the novel linear and lateral relative shifting of the implement legs 11, 12 has been found to be most effective for the purposes set forth, and renders my garden tool a valuable adjunct to the normal garden equipment found in the home.

In some cases a weed may not be readily removed by a simple pulling action thereon because of a relatively thick and/or deep root associated therewith, as is often the case with dandelion or plantain. My garden tool permits the ready removal of objectionable growth of this character as may readily be seen in FIG. 13. The tool is initially gripped and the legs 11, 12 shifted linearly with respect to one another, as in the clearing action of FIG. 11, and the tool is thence inserted into the ground adjacent the objectionable plant W, FIG. 13. By virtue of the sharpened edge 21, FIG. 4, of at least one leg or the inserted leg of the implement, the relatively thick depending tap root R of the weed may be efficiently and quickly severed as illustrated in FIG. 13, after which the weed may be removed as illustrated in connection with FIGS. 9, 10 and 11. Where the root growth of the objectionable plant W is extensive or relatively thick, the serrated bottom edge 21 or tapered side edges 22 of the leg blade 16 are beneficial in permitting a sawing or cutting action against the root whereby the same may be readily severed for removal as above set forth. Legs 11, 12 may be interlockingly rigidified as in FIG. 3 to aid cutting thick roots.

The described linear shifting characteristic of the legs of my tool, is also beneficial with respect to the cultivation of the earth or soil around young and tender shoots or sprouts of growing plants, wherein it is desired to loosen the soil or break away incipient weed growth. Similarly, after removal of a weed, it may be desirable to scrape or rake the soil around the weed so as to fill up and level the hole from which the weed was removed.

This is readily accomplished by shifting the garden tool in the hand so that the leg 12 projects forwardly relative to leg 11, as seen in FIG. 14, or in a shift direction opposite to the that illustrated in connection with the root severing action of FIG. 13. With the leg 12 thus forwardly shifted, the tool may be employed as a hand held rake to scrape, cultivate or level the soil by a simple hand action thereover, as seen in FIG. 14.

Further, in connection with the trash clearing linear shifting movements of FIG. 11, the severing shifting movement of FIG. 13, or the cultivating shifting movement of FIG. 14, it will be noted that the internal spacer portions 15 of the tool legs 11, 12 remain in close proximity or contact with one another, thereby internally bracing the tool in the thus linearly shifted position thereby preventing collapse of the spring 13 and affording the desirable fulcrum movement thereof as aforesaid.

The modified form of my garden tool 10a illustrated in FIGS. 5–8 is similar in many respects to that of the preferred form of my invention, with the chief exception that the lateral shifting movement of legs 11, 12 as seen in FIG. 12 cannot be effected therewith.

The legs 11a, 12a of the modified form of FIG. 5 are similar to those legs 11, 12 of FIG. 1, with the exception that upper portions 15a of each leg do not converge inwardly in spaced confronting relation, but rather the upper ends thereof are pivotally secured to a top rigid bridge element 23. The legs 11a and 12a may be rigidly secured to the bridge plate 23 in any convenient manner such as by suitably notching the confronting edges of the legs and bridge in complementary fashion as seen in FIG. 6, and folding the metal about the hinge pins 24. The legs 11a, 12a are normally held in spaced relation as illustrated in FIG. 5 by means of a pair of light torsion springs 25, the springs being disposed around the hinge pin 24 with projecting end portions thereof engaging respectively the leg portion 15a and the underside of the plate 23, in a manner that is well known in the art.

Attached to and depending from the underside of the bridge plate 23 is a brace leg 26 which serves to maintain the upper portions of the legs 11a, 12a in relatively spaced relation when the legs are linearly shifted as in FIG. 8. The brace 26 will engage against an adjacent upper leg portion 15a when the legs are linearly shifted to weed clearing, severing or raking position as disclosed in connection with FIGS. 11, 13 and 14 of the preferred embodiment. It will be apparent that with the exception of the lateral shifting action of the legs as illustrated in FIG. 12, of the preferred embodiment, the modified garden tool 10a of FIGS. 5–8 can perform all of the operations disclosed in connection with the form of the garden tool 10 of FIG. 1. As with the spring arch 13 of FIG. 1, the bridge plate 23 of FIG. 5 serves as a pressure area for the hand in inserting the tool into the ground about a weed.

In addition to the several gardening and cultivating uses of the tool as above discussed, it is readily apparent that my device may equally with facility be employed for picking up litter, trash and the like from sidewalks, lawns etc.

From the foregoing it will be seen that I have provided a garden implement which is exceedingly versatile in nature, inexpensive to manufacture, and by virtue of the novel structural features thereof capable of performing the various operations and uses to which it is put in a speedy, effective and efficient manner, all with a single hand-held implement of the character disclosed. Further the same is comfortable to the use for prolonged use by virtue of the broad flat characteristics of the legs and resilient arch or bridge plate, while the elongated recesses 18 permit the sure and comfortable gripping thereof by a plurality of fingers so as to prevent slippage of the tool from the hand and permit exertion of maximum force thereon when necessary.

Minor changes in the shape and construction of the several elements of my garden implement may be made therein as will be obvious to those skilled in the art within the scope of the appended claims, without departing from the character of my invention as set forth therein.

I claim:
1. A garden implement comprising
  a pair of legs disposed in confronting relation, each said leg including:
    (1) a lower cultivating portion terminating in a sharpened edge;
    (2) an intermediate portion having a transversely extending outwardly facing finger grip recess; and
    (3) an upper portion;
  a resilient strip of material secured at each end respectively to one of said legs and extending therebetween in curving relation thereto adjacent said upper leg portions for providing for both linear and lateral shifting of one leg relative to the other during garden cultivation,
  and a lock notch on one lateral edge of each said leg lower portion with said notches being disposed upon opposite edges of the confronting legs, whereby the legs may be interlocked upon lateral shifting thereof.

2. A garden implement comprising
  a pair of legs disposed in confronting relation, each said leg including:
    (1) a lower cultivating portion terminating in a sharpened edge;
    (2) an intermediate portion having a transversely extending outwardly facing finger grip recess; and
    (3) an upper portion;
  a resilient strip of material secured at each end respectively to each of said legs and extending therebetween in curving relation thereto adjacent said upper leg portions for providing for both linear and lateral shifting of one leg relative to the other during garden cultivation,
  said leg upper portions converging upwardly in inwardly spaced relation to said resilient strip to terminate in more closely spaced relation to each other than the said leg lower portions,
  whereby when said legs are manually urged closer together, said upper leg portions contact each other to form a fulcrum about which said intermediate and lower leg portions pivot to increase the grasping force in garden cultivation operations.

3. The garden implement of claim 2 wherein the adjacent terminal ends of said upper leg portions are smoothly rounded to permit linear and lateral shifting of said legs while said upper leg portions are in mutual contact.

4. The implement of claim 2 wherein a lock notch is provided on one lateral edge of each said leg lower portion with said notches being disposed upon opposite edges of the confronting legs, whereby the legs may be interlocked upon lateral shifting thereof.

5. A garden implement comprising
  a pair of legs disposed in confronting relation, each said leg including:
    (1) a lower cultivating portion terminating in a sharpened edge;
    (2) an intermediate portion having a transversely extending outwardly facing finger grip recess; and
    (3) an upper portion;
  means secured to each of said legs and extending therebetween adjacent the upper portions thereof for providing for swinging movement of said lower leg portions toward and away from each other during garden cultivation,
  and means for limiting inward approach of said upper leg portions toward each other while providing for further motion of said leg intermediate portions toward each other in applying grasping force during cultivation operations.

6. The garden implement of claim 5 further including means for interlocking said legs to facilitate transport and storage of the implement.

References Cited in the file of this patent
UNITED STATES PATENTS

| | | |
|---|---|---|
| 110,211 | Davis | Dec. 20, 1870 |
| 567,087 | Fitzgerald et al. | Sept. 1, 1896 |
| 789,539 | Harris | May 9, 1905 |
| 908,266 | Jackson | Dec. 29, 1908 |
| 968,740 | Case | Aug. 30, 1910 |

FOREIGN PATENTS

| | | |
|---|---|---|
| 402,605 | Great Britain | Dec. 7, 1933 |
| 430,085 | Great Britain | June 13, 1935 |